United States Patent
Trippold et al.

(10) Patent No.: US 10,323,578 B2
(45) Date of Patent: Jun. 18, 2019

(54) DIVERTING SYSTEM

(71) Applicant: Ansaldo Energia Switzerland AG, Baden (CH)

(72) Inventors: Siegfried Trippold, Bad Säckingen (DE); Andre Koenig, Waldshut-Tiengen (DE); Philipp Moller, Untersiggenthal (CH); Joerg Pfistner, Wettingen (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 698 days.

(21) Appl. No.: 14/868,943

(22) Filed: Sep. 29, 2015

(65) Prior Publication Data
US 2016/0102615 A1 Apr. 14, 2016

(30) Foreign Application Priority Data
Oct. 8, 2014 (EP) .................................... 14188146

(51) Int. Cl.
*F02C 6/18* (2006.01)
*F02C 9/18* (2006.01)
*F01K 23/10* (2006.01)
*F02C 3/04* (2006.01)

(52) U.S. Cl.
CPC .............. *F02C 9/18* (2013.01); *F01K 23/101* (2013.01); *F02C 3/04* (2013.01); *F02C 6/18* (2013.01); *F05D 2220/32* (2013.01); *F05D 2220/72* (2013.01); *Y02E 20/16* (2013.01)

(58) Field of Classification Search
CPC ............. F02C 6/18; Y02E 20/16; F01K 23/10
See application file for complete search history.

(56) References Cited

U.S. PATENT DOCUMENTS

| 3,897,773 A | * | 8/1975 | Burt | F16K 11/052 110/163 |
| 4,027,654 A | * | 6/1977 | Kannapell | C21B 7/005 110/163 |
| 4,437,313 A | * | 3/1984 | Taber | F01K 23/101 60/39.182 |

(Continued)

FOREIGN PATENT DOCUMENTS

| CN | 102026708 A | 4/2011 |
| DE | 1526182 A1 | 3/1970 |

(Continued)

OTHER PUBLICATIONS

First Office Action dated Oct. 23, 2018 in corresponding Chinese Patent Application No. 201510643404.7, and an English translation thereof.

(Continued)

*Primary Examiner* — Gerald L Sung
(74) *Attorney, Agent, or Firm* — Buchanan Ingersoll & Rooney PC (57) ABSTRACT

The present invention generally relates to a diverting system to be used in a combined-cycle power plant. According to the invention, the diverting system is integrated within the by-pass stack and carries out, in a sole component, the functions of by-passing the hot exhaust flow in a single-cycle configuration or guiding it through the HRSG, acting as a diffusor, in an open combined-cycle configuration.

11 Claims, 12 Drawing Sheets

(56) References Cited

U.S. PATENT DOCUMENTS

| | | | | |
|---|---|---|---|---|
| 4,821,507 A * | 4/1989 | Bachmann | ............ | F16K 11/052 137/875 |
| 5,120,021 A * | 6/1992 | Squirrell | .................. | F16K 1/16 137/625.44 |
| 5,299,601 A * | 4/1994 | Koch | .................. | F16K 31/521 137/875 |
| 5,493,854 A * | 2/1996 | Nielsen | ................ | F01D 25/305 60/39.182 |
| 5,503,221 A * | 4/1996 | Koudijs | ................. | F01D 25/30 137/875 |
| 5,697,596 A * | 12/1997 | Kremers | .............. | F16K 11/052 137/875 |
| 6,050,084 A * | 4/2000 | Schutz | ................... | F01D 25/30 181/213 |
| 7,718,153 B2 | 5/2010 | Sobolevskiy et al. | | |
| 9,291,342 B2 * | 3/2016 | Kramer | .................. | F01D 25/30 |
| 2003/0192737 A1 | 10/2003 | Han et al. | | |
| 2005/0268594 A1 * | 12/2005 | Kurihara | .................. | F02C 9/16 60/39.182 |
| 2010/0058764 A1 * | 3/2010 | Conchieri | ............. | F01K 23/106 60/739 |
| 2011/0277484 A1 * | 11/2011 | Dominiak | ............... | F01D 25/12 60/801 |
| 2016/0356219 A1 * | 12/2016 | Ferraris | .................... | F02C 6/18 |

FOREIGN PATENT DOCUMENTS

| | | |
|---|---|---|
| EP | 0 358 866 A1 | 3/1990 |
| EP | 2 325 559 A1 | 5/2011 |
| GB | 869394 A | 5/1961 |
| WO | 92/05380 | 4/1992 |

OTHER PUBLICATIONS

Examination Report dated Dec. 20, 2018 in corresponding GCC Patent Application No. GC 2015-30134.

* cited by examiner

DIVERTING SYSTEM

CROSS-REFERENCE TO RELATED APPLICATIONS

This application claims priority to European Patent application No. 14188146.6 filed Oct. 8, 2014, the contents of which are hereby incorporated in its entirety.

TECHNICAL FIELD

The present invention generally relates to a diverting system to be used in a combined-cycle power plant.

BACKGROUND

As well known, gas turbine engines produce useful work by driving a turbine shaft by means of hot gasses obtained by the combustion of compressed natural gas such as air. To improve the overall efficiency of work production, a steam power plant is arranged in combination with the gas turbine plant. In such assembly, the heated gases exiting the turbine flow through an exhaust duct to a heat recovery steam generator (HRSG). The heat from the gases is then utilized in the HRSG to heat water and produce steam, which is in turn used to drive a steam turbine.

Conventional combined-cycle plants as described above are equipped with diverter damper that allows the power plant, comprising the gas turbine plant and the steam power plant, to operate in either a simple-cycle or a combined-cycle mode. To this purpose, a by-pass damper is typically configured to move between a closed or blocking position when operating in a single-cycle mode, where the hot exhaust gas exiting the gas turbine is guided through a by-pass stack part and disposed in the environment, and an open position, operating in a combined-cycle mode, where the hot exhaust gas is admitted in the HRSG and used to produce steam.

In current installations, a diverter damper system for gas turbine applications is usually separated from the gas turbine and the HRSG by an expansion joint positioned at the inlet and outlet of the diverter system. Such known diverting systems are structurally independent from the two major components of gas turbine and steam turbine power plants, interposed there between with a self-sustaining steel structure.

Such systems comprise a first assembly having a blank off plate having upper ends hinged to a supporting structure and movable between a vertical blocking position and a horizontal open position where the exhaust flow is guided versus the HRSG. Downstream the diverting system is located a diffusor component, configured to obtain the critical flow requirements for optimal hot gas temperature distribution and to maximise the efficiency of the heat exchange within the HRSG.

However, such configuration requires the installation of several structurally independent components in series, therefore critically increasing the overall space required for the power plants installation.

SUMMARY

The object of the present invention is to solve the aforementioned technical problems by providing a diverting system.

According to preferred embodiments, which will be described in the following detailed description only for exemplary and non-limiting purposes, the present solution teaches to integrate a diverting system within the HRSG inlet duct structure including, in a sole component, the functions of by-passing the hot exhaust flow in a single-cycle configuration or guiding it through the HRSG, also acting as a diffusor, in an open combined-cycle configuration.

This important technical advantage is achieved by providing a diverting system configured to be arranged in a combined-cycle plant downstream an exhaust end of a gas turbine and integrated within an inlet duct structure of a heat recovery steam generator, the diverting system being movable between a single-cycle closed position guiding hot exhaust flow through a by-pass stack part and a combined-cycle open position allowing hot exhaust gas to flow into the heat recovery steam generator, the diverting system comprising also a primary blank off plate configured to reciprocate in a vertical direction between the open and closed positions, and wherein the primary blank off plate comprises a first portion arranged along a side wall of the by-pass stack part and a second portion arranged transversely across a section of the stack part.

According to a further aspect of the invention, the second portion of the blank off plate is inclined with respect to a horizontal direction, such to act as a top wall diffusor for the exhaust gas flowing in the heat recovery steam generator, when the diverting system is in the combined-cycle open position.

According to a further preferred aspect of the invention, the primary blank off plate comprises a supporting plate interposed between said first and second portions. Preferably, the primary blank off plate comprises airfoil-shaped flow guiding elements, anchored on the supporting plate.

According to a further preferred aspect of the invention, the diverting system according comprises a secondary isolation blank off plate, arranged adjacent to the first portion of the primary blank off plate along the side wall of the by-pass stack part, and configured to reciprocate between said open and closed positions. Preferably, the primary and secondary blank off plates are distanced from each other along the side wall of the by-pass stack such to establish an air filled sealing gap there between.

According to a further aspects of the invention, the primary and secondary blank off plates are preferably moved along rail tracks arranged on the side wall of the by-pass stack part by two independent lifting mechanisms, which may be mechanical, for example based on counterweights, or electrically driven.

By placing a diverting system according to the present invention downstream the gas turbine plant and at the inlet section of the HRSG important benefits can be gained. In fact, advantageously, the overall power plant footprints can be reduced since the distance between the gas turbine and HRSG is shortened by the freed space previously occupied by conventional diverter dampers.

Furthermore, important material savings are experiences since sections of the HRSG inlet duct act as the outer cladding of the diverter damper; HRSG structural steel beams will accommodate the silencer and stack part of the diverter and only one expansion joint will be needed. The use of electric or mechanical drive mechanisms for reciprocating the blank off plates eliminate the fire hazard of conventional hydraulic drive mechanisms, utilised for conventional type of dampers.

The diverting system according to preferred embodiments allows effortless operating in various gas turbine operation modes. The primary blank off plate is used for operational freedom during various power plant load scenarios. The secondary blank off plate ensures maximum safety for personnel working downstream of the planking plate during construction, inspection or maintenance phases in the hot gas path area of the HRSG.

Preferably, the driving mechanisms guiding the primary and secondary blank off plates are independent from each other.

While conventional diverter dampers only operate by-pass or non-by-pass mode and only gas turbine offline or low load operation switch over mode, the diverting system according to the present invention may cover, advantageously, the following operational functions: a. Normal open HRSG mode; b. simple By-pass mode; c. safe By-pass mode; d. gas turbine low load and full load switch over mode; e. HRSG preheating mode for gas Turbine full load switch over; f. HRSG 10% to 90% by-pass operation modes for maximum efficiency power plant operations.

BRIEF DESCRIPTION OF DRAWINGS

The foregoing objects and many of the attendant advantages of this invention will become more readily appreciated as the same becomes better understood by reference to the following detailed description when taken in conjunction with the accompanying drawings, wherein:

FIGS. 1 and 2 show a general view of combined-cycle plant including a gas turbine plant, a steam power plant and a diverting system according to the present invention interposed there between;

DETAILED DESCRIPTION

Figure 1:
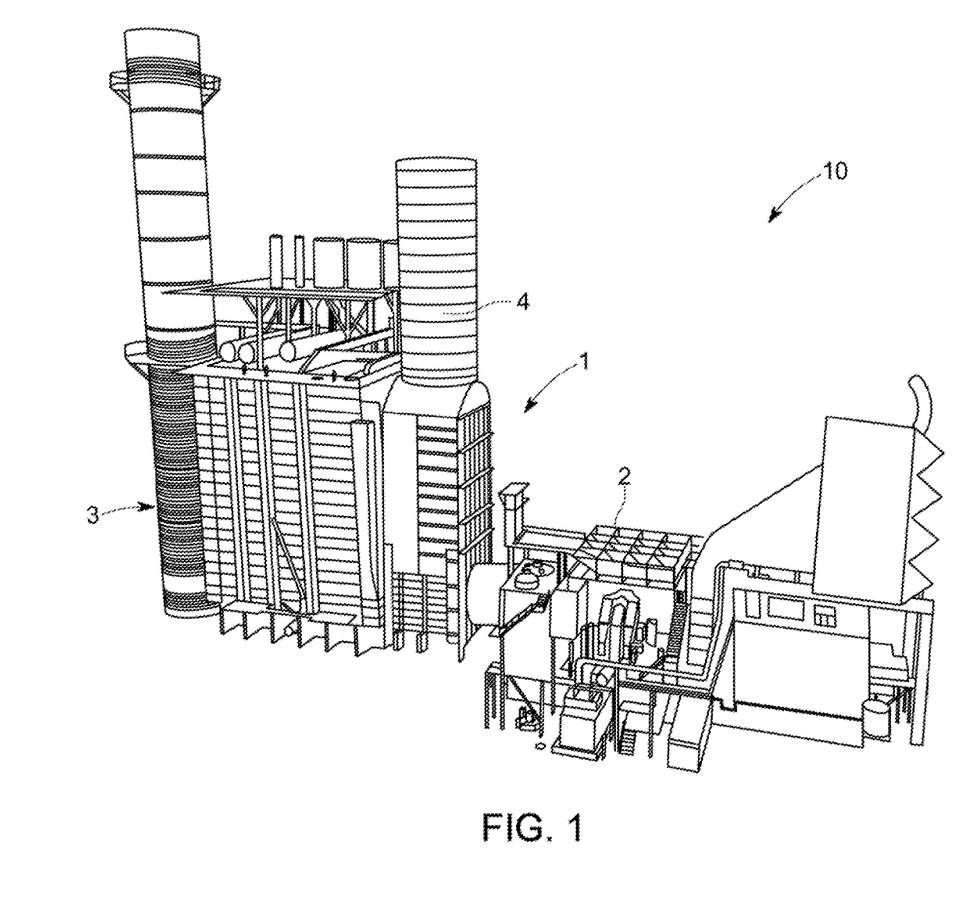

With reference to FIG. 1, it is generally showed a combined cycle plant 10. The combined cycle plant includes a gas turbine plant 2 and a heat recovery steam generator 3 (referred to as HRSG in the following) associated to a steam power plant, which uses the hot gas exhaust coming from the gas turbine to heat water and produce steam. The combined cycle plant comprises a diverting system 1 which is incorporated within an inlet duct structure of the HRSG and below a by-pass stack part, indicated with reference numeral 4.

Figure 2:
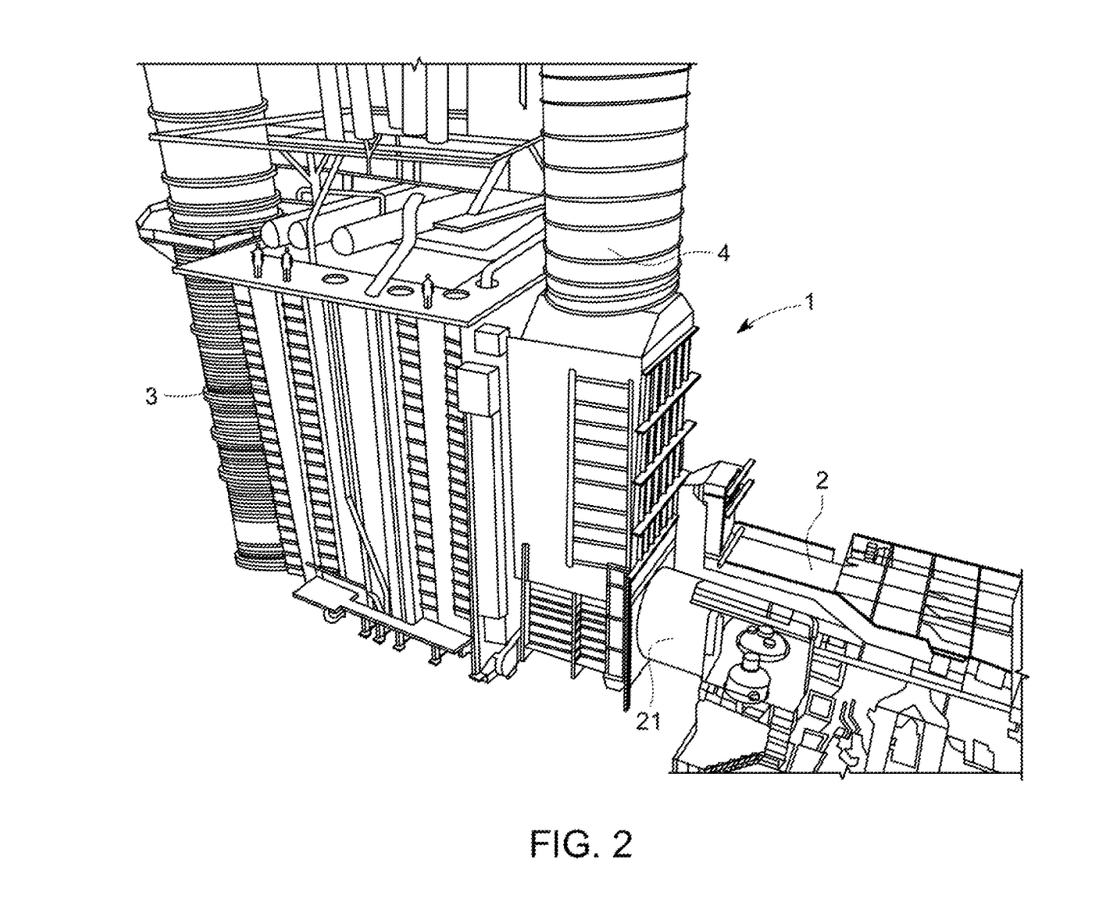

More in particular, with reference to next FIG. 2, the hot exhaust gas exiting the gas turbine plant 2 from an exhaust duct 21 is admitted into the diverting system 1. The diverting system 1 then elaborates the gas and guides it towards the by-pass stack 4 above if a single-cycle and or a maintenance operation is needed, or admits it into the HRSG if a combined cycle is requested. To this purpose, the diverting system 1 is internally movable between a single-cycle closed position wherein the hot exhaust gas is guided through the by-pass stack part 4, and a combined-cycle open position wherein the hot exhaust gas is admitted into the HRSG 3.

Figure 3:
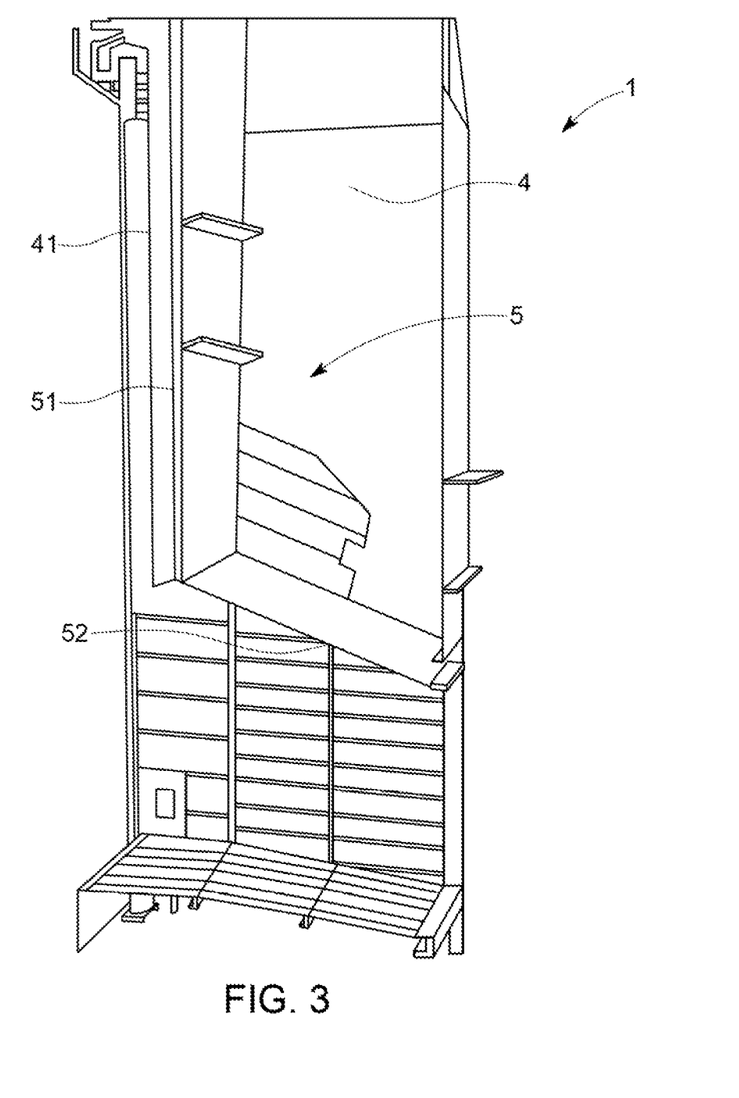
FIGS. 3-6 show a vertical section of the diverting system depicted in FIGS. 1 and 2.

With reference to FIG. 3, it is shown a vertical section of the diverting system 1, where its internal components are now visible. In particular, the diverting system 1 comprises a primary blank off plate 5 adapted to reciprocate in a vertical direction between the open and closed positions, as it will be explained in details. In FIG. 3 the primary blank off plate 5 is arranged in the combined-cycle open position. The primary blank off plate 5 comprises a first portion 51 arranged along a side wall 41 of the by-pass stack part 4, and a second portion 52 which is arranged transversely across the by-pass stack part 4. Preferably, the second portion 52 of the primary blank off plate 5 is inclined with respect to a horizontal direction. This way, when the diverting system is in the open combined-cycle configuration as depicted in FIG. 3, the second portion 52 of the plate 5 acts as a top wall diffusor for the exhaust gas flowing below towards the HRSG (not shown in the figure). In other words, the second portion 52 is given, advantageously, a conical shape such to obtain the critical flow requirements for optimal hot gas temperature distribution such to maximise the efficiency of the heat exchange within the HRSG (not shown in the figure) to which the gas is directed.

Figure 4:
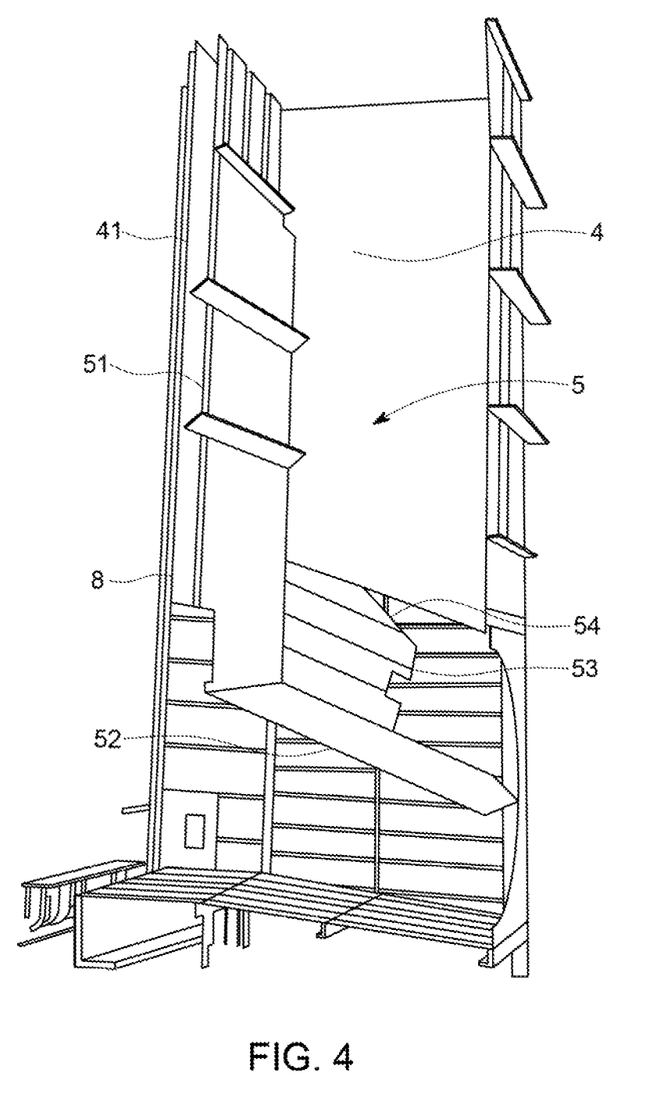

With reference to the following FIG. 4, it is shown the vertical section of the diverting system when the primary blank off plate 5 is positioned half way between the combined-cycle open position depicted in FIG. 3 and the single-cycle closed position. The primary blank off plate 5 can comprise a supporting plate 53, which is interposed between the first and second portions 51 and 52. The supporting plate 53 can carry airfoil-shaped elements 54, for guiding and directing the hot flow with maximum efficiency through the by-pass stack part 4.

Figure 5:
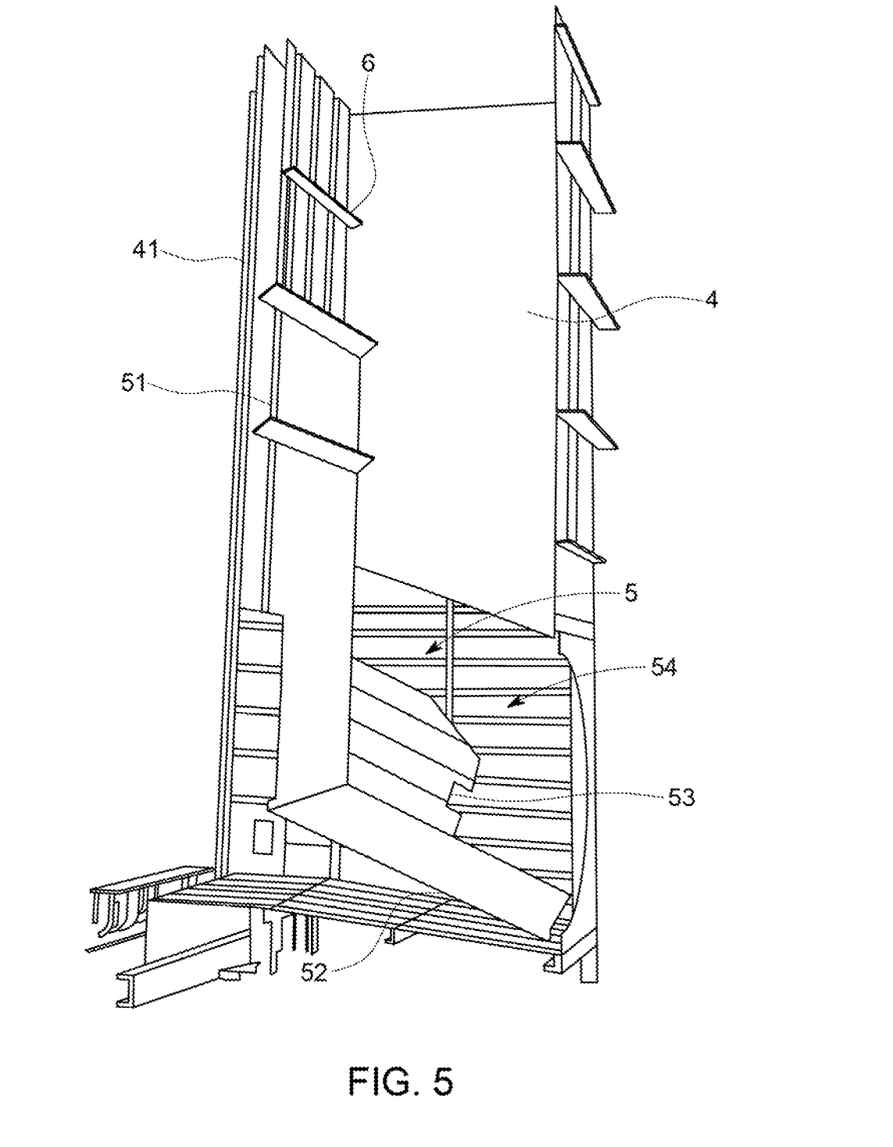

With reference to FIG. 5, it is depicted the diverting system according to the invention in the single-cycle closed position, that is the primary blank off plate 5 is completely lowered downwards. This way, the hot exhaust gas exiting the gas turbine (not shown) is all diverted towards the by-pass stack part 4 above. The diverting system comprises rail tracks 6 which are associated to the primary plate 5, through which the plate 5 reciprocates in the vertical direction to switch between the open and closed configuration.

Figure 6:
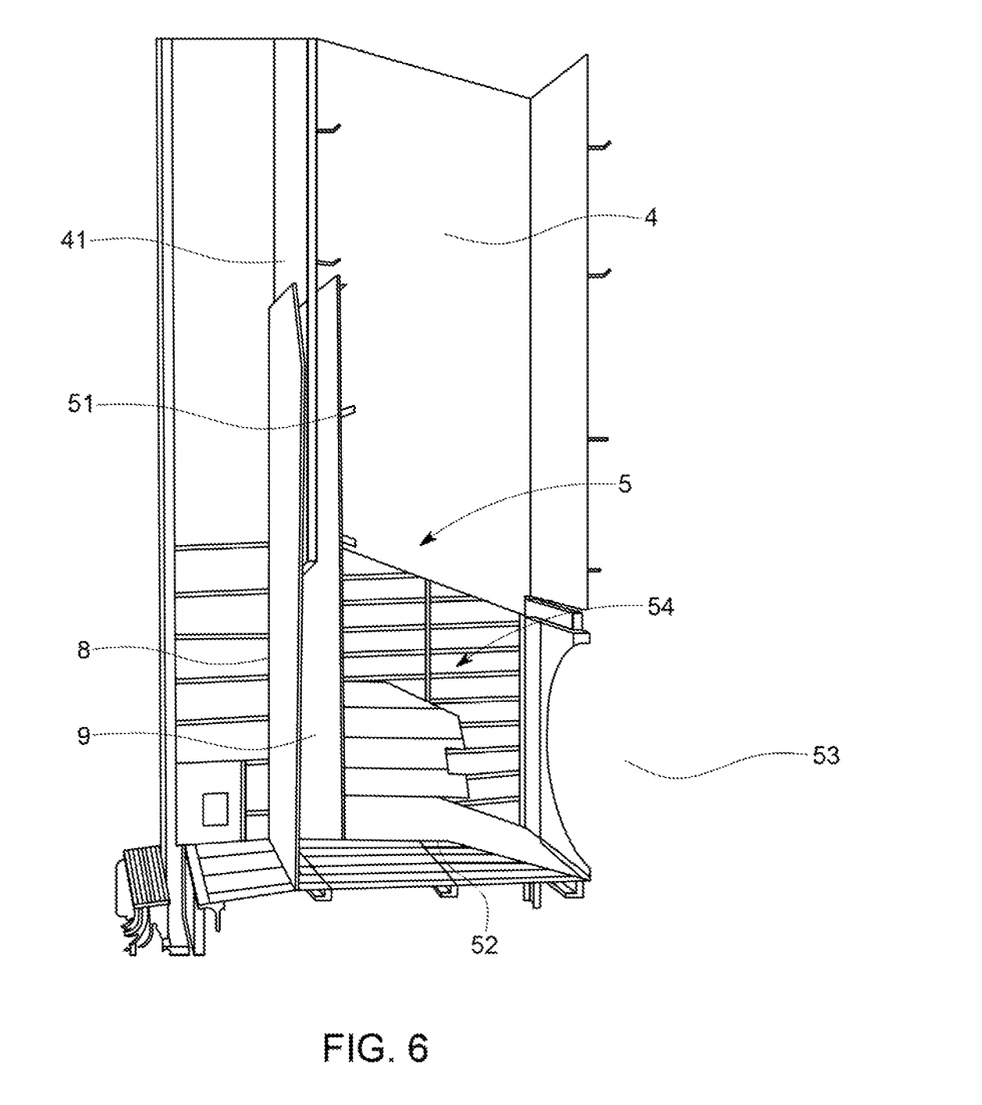

Making now reference to the following FIG. 6, it is still shown the diverting system according to the invention in the single cycle closed configuration. In particular, the diverting system 1 can also comprise a secondary isolation blank off plate 8, which is arranged adjacent to the first portion 51 of the primary plate 5 along the side wall 41 of the by-pass stack 4. The secondary isolation plate 8 is configured to reciprocate vertically between the open and closed positions in the same way as the primary blank off plate 5. The isolation plate 8 is needed to establish a further sealing means of the by-pass stack part 4, in case working personnel is required to perform maintenance activities inside the HRSG. Therefore it is of the utmost importance for safety reasons to ensure a proper thermal isolation of the HRSG from the by-pass stack part 4, where the hot exhaust gas is directed by the diverting system when arranged in the single-cycle closed position.

To further improve the thermal isolation of the HRSG by means of the secondary isolation plate 8, the first portion of the primary plate 5 and the secondary plate 8, advantageously, are distanced from each other along the side wall 41 such to establish an air filled sealing gap 9 there between.

Figure 7:
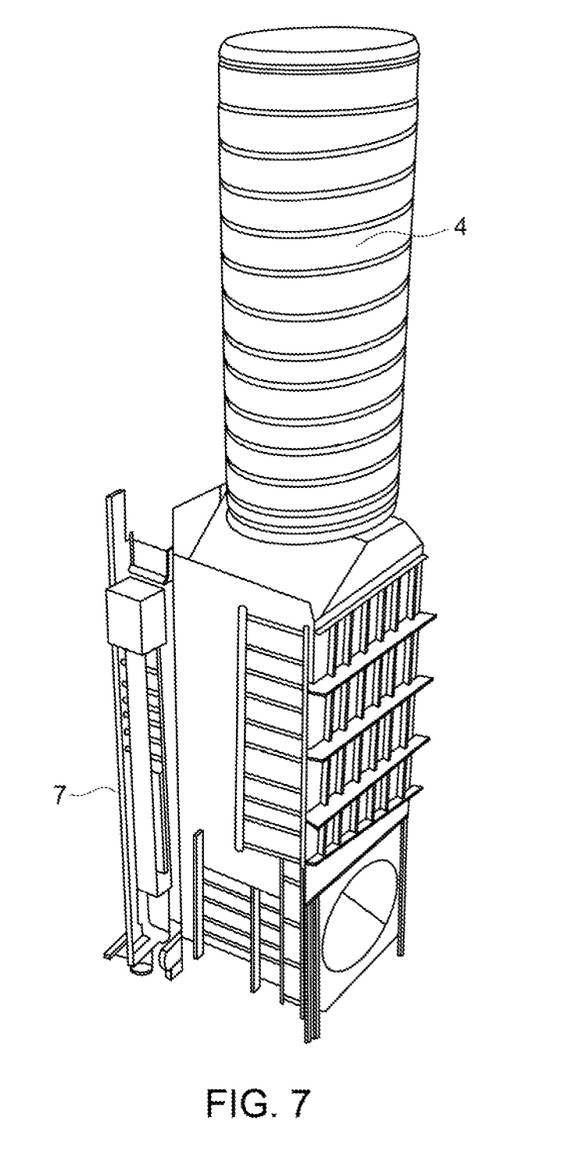
FIGS. 7-8 show various particulars of the diverting system according to the present invention.

With now reference to 7, the diverting system according to the invention, comprises a first driving mechanism 7 configured to reciprocate the primary blank off plate along the vertical direction (not visible in the figure because inside the inlet duct structure of the HRSG). Preferably, the driving mechanism 7 comprises a system based on counterweights. Similarly, the secondary isolation mechanism comprises a second driving mechanism (not shown) configured to reciprocate the secondary plate (not shown) between the open and closed positions. Preferably, the first and second driving mechanisms are independent from each other.

Figure 8:
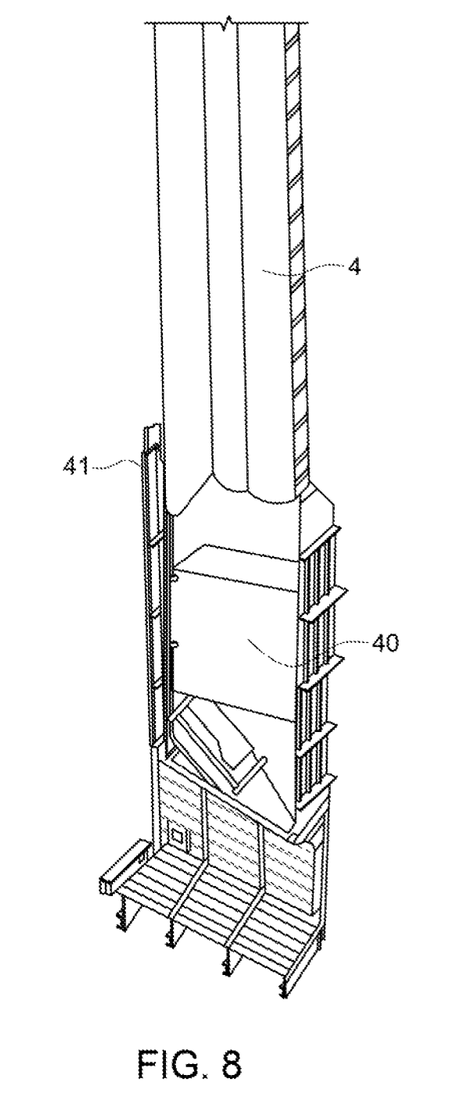

Next FIG. 8 shows a vertical section of the diverting system and the by-pass stack part 4 positioned above, wherein a silencer stack part 40 is visible.

With reference now to FIGS. 9-12, different operational modes, achievable by means of the diverting system according to the invention, are depicted.

Figure 9:
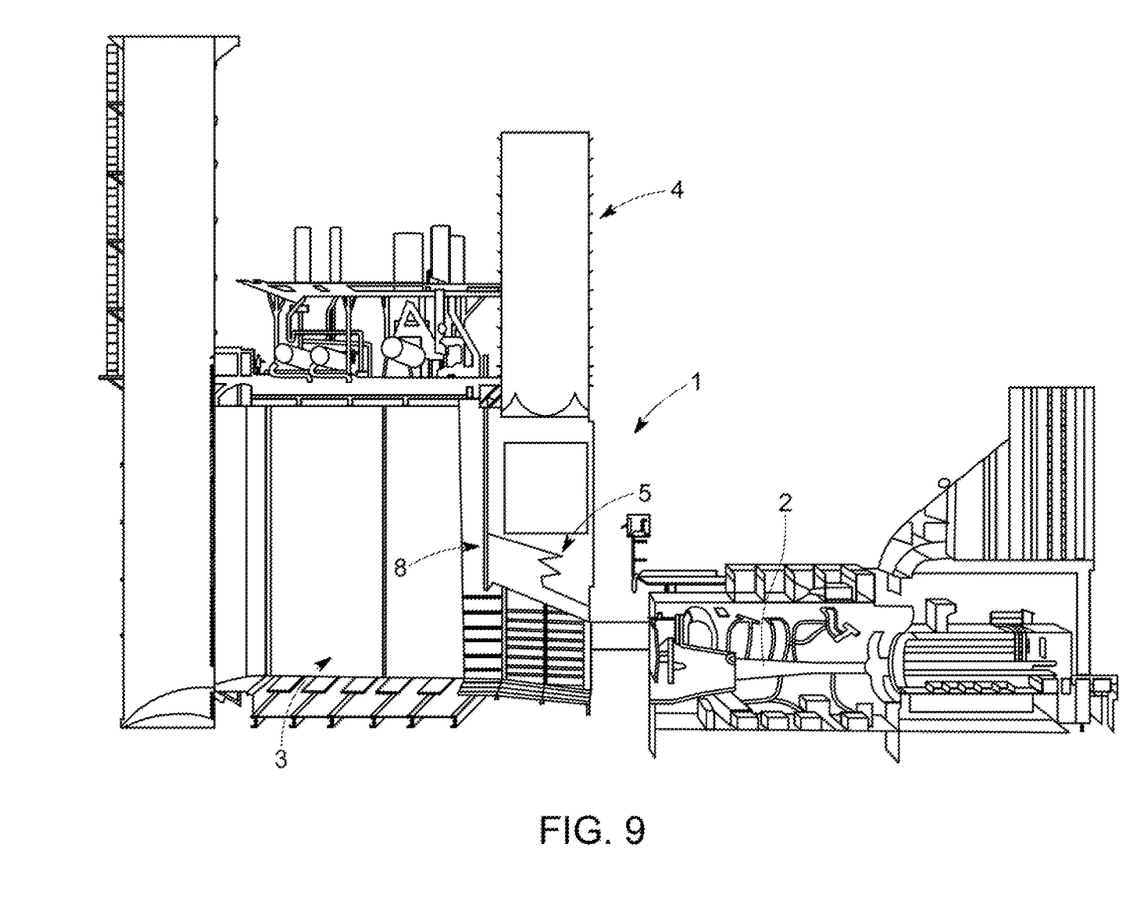
FIGS. 9-12 show different modes of utilization during a single cycle or combined cycle mode with the diverting system according to the invention.

In particular, FIG. 9 shows a combined-cycle mode where the diverting system 1 is arranged in the open position having the blank off plate, integrated in the inlet duct structure of the HRSG 3, in the upwards position. In this way, the hot exhaust gas coming from the gas turbine 2 is admitted in the HRSG 3. In particular, the second portion of the blank off plate 5, with its conical shape, advantageously acts as a top wall diffusor for the gas flowing below, thus giving it the optimal hot gas temperature distribution for maximising the efficiency of the heat exchange within the HRSG 3.

Figure 10:
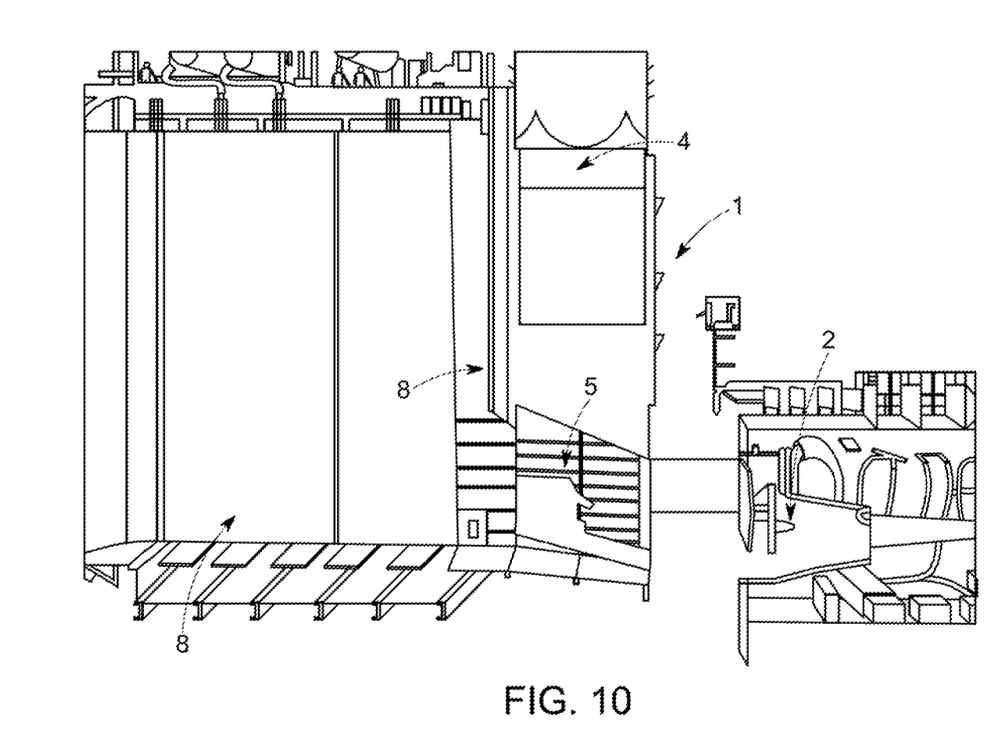

FIG. 10 shows the power plant in the single-cycle mode, where the blank off plate 5 of the diverting system 1 is arranged in the downward position. In this operational configuration, the hot exhaust gas is diverted by the plate 5 towards the by-pass stack part 4 above.

Figure 11:
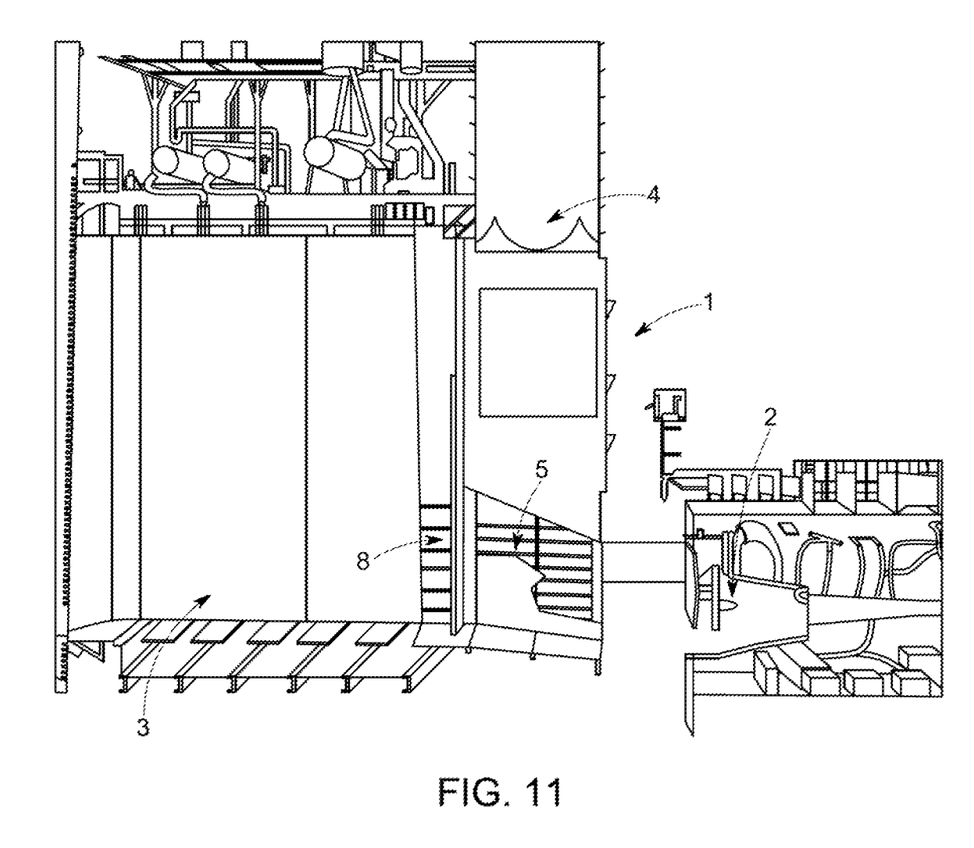

FIG. 11 shows the diverting system 1 in the single-cycle mode with the secondary isolation plate 8 in the downward position as well. Such configuration may be used when working personnel is located in the HRSG 3 for maintenance operation and an additional thermal isolation from the hot gas exhaust exiting the gas turbine 2 is required for safety reasons.

Figure 12:
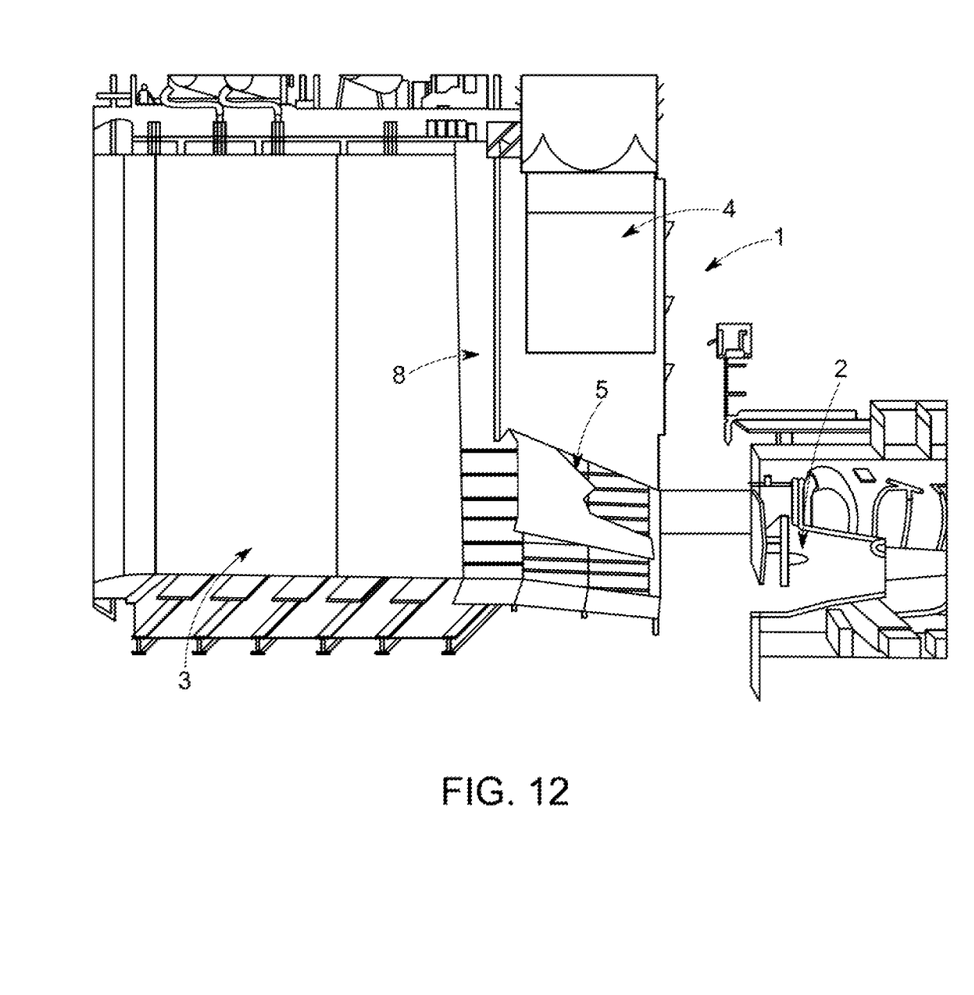

Lastly, FIG. 12 shows an intermediate configuration where the blank off plate 5 is kept half way between the open combined-cycle and closed single cycle configurations. By regulating the height of the blank off plate 5 along the by-pass stack 4 is possible, by means of the second portion of the plate arranged transversely across the by-pass stack, to adjust the flow of the hot exhaust gas through the diverting system 1 and splitting it into two portions, one portion entering into the HRSG for heat recovery, and the remaining one flowing through the by-pass stack 4. This way, advantageously, both single-cycle and combined-cycle operational modes are achievable simultaneously.

As it will be appreciated, the diverting system according to the invention advantageously allows running a combined-cycle power plant in a versatile manner, compared to known kind of installations.

In fact, the height of the primary blank off plate can be adjusted in order to achieve the desired load allocation between the disposed gas flow flowing through the stack part and the gas flowing through the HRSG for heat recovery: different ratios can be applied based on the particular applicative scenario.

More in particular, the blank off plate can be fully arranged upwards, in the combined cycle open position, this way having the 100% of the exhaust hot gas flowing through the HRSG. Differently, the blank off plate may be lowered to achieve a different ratio, the height of the plate determining the ratio between the portion of the hot gas flowing through the HRSG and the remaining one disposed through the stack part.

Following ratios may be obtained:
100% to 0% hot gas flowing through the HRSG—0 to 100% hot gas disposed by the by-pass stack Although the present invention has been fully described in connection with preferred embodiments, it is evident that modifications may be introduced within the scope thereof, not considering the application to be limited by these embodiments, but by the content of the following claims.

The invention claimed is:

1. A diverting system configured to be arranged in a combined-cycle plant downstream of an exhaust end of a gas turbine and within an inlet duct structure of a heat recovery steam generator, the diverting system comprising:
   a single-cycle closed position, the diverting system being configured to be movable between the single-cycle closed position for guiding hot exhaust flow through a by-pass stack part, and a combined-cycle open position for allowing hot exhaust gas to flow into the heat recovery steam generator;
   a primary blank off plate configured to reciprocate in a vertical direction in a range of motion parallel to a side wall of the by-pass stack part between said open and closed positions, wherein said primary blank off plate includes a first portion configured to be arranged along the side wall of the by-pass stack part, and a second portion configured to be arranged transversely across a section of the by-pass stack part; and
   a secondary isolation blank off plate configured to be arranged parallel and adjacent to said first portion of said primary blank off plate along the side wall of the by-pass stack part, and configured to reciprocate between said open and closed positions, wherein said primary blank off plate and said secondary isolation blank off plate are arranged to be distanced from each other along the side wall of the by-pass stack part to establish an air filled sealing gap there between.

2. The diverting system according to claim 1, wherein said second portion of said blank off plate is inclined with respect to a horizontal direction, to act as a top wall diffusor for the exhaust gas when flowing in the heat recovery steam generator when the diverting system is in said combined-cycle open position.

3. The diverting system according to claim 1, wherein said primary blank off plate comprises:
   a supporting plate interposed between said first and second portions.

4. The diverting system according to the claim 3, wherein said primary blank off plate comprises:
   airfoil-shaped flow guiding elements, anchored on said supporting plate.

5. The diverting system according to claim 1, comprising:
   one or more first rail tracks associated to said primary blank off plate.

6. The diverting system according to claim 1, comprising:
   a first driving mechanism configured to reciprocate said primary blank off plate between said open and closed positions.

7. The diverting system according to claim 6, wherein said first driving mechanism comprises:
   a system based on counter-weights.

8. The diverting system according to claim 1, comprising:
   a second driving mechanism configured to reciprocate said secondary isolation blank off plate between said open and closed positions.

9. The diverting system according to claim 8, wherein said first and second driving mechanisms are independent from each other.

10. A method of running a combined-cycle plant, the combined-cycle plant having a diverting system configured to be arranged downstream an exhaust end of a gas turbine and within an inlet duct structure of a heat recovery steam generator (HRSG), the diverting system being movable between a single-cycle closed position for guiding hot exhaust flow through a by-pass stack part and a combined-cycle open position allowing hot exhaust gas to flow into the heat recovery steam generator, the diverting system having a primary blank off plate configured to reciprocate in a vertical direction in a range of motion parallel to a side wall of the by-pass stack part between said open and closed positions, said primary blank off plate having a first portion arranged along the side wall of the by-pass stack part and a second portion arranged transversely across a section of the stack part, and a secondary isolation blank off plate configured to be arranged parallel and adjacent to said first portion of said primary blank off plate along the side wall of the by-pass stack part, and configured to reciprocate between said open and closed positions, wherein said primary blank off plate and said secondary isolation blank off plate are arranged to be distanced from each other along the side wall of the by-pass stack part to establish an air filled sealing gap there between, the method comprising:

adjusting, during operation, a height of the blank off plate and the secondary isolation blank off plate, along said by-pass stack part between said open and closed positions, to achieve different allocations of a first portion of the hot exhaust gas flowing into the HRSG and a second portion of the hot exhaust gas flowing through the by-pass stack part.

11. A combined-cycle power plant comprising:

a gas turbine plant;

a steam power plant;

a heat recovery steam generator associated with the steam power plant; and a diverting system arranged downstream of an exhaust end of the gas turbine and within an inlet duct structure of the heat recovery steam generator, the diverting system including:

a single-cycle closed position, the diverting system being configured to be movable between the single-cycle closed position in which hot exhaust flow is guided through a by-pass stack part, and a combined-cycle open position, in which hot exhaust gas is allowed to flow into the heat recovery steam generator;

a primary blank off plate configured to reciprocate in a vertical direction in a range of motion parallel to a side wall of the by-pass stack part between said open and closed positions, wherein said primary blank off plate includes a first portion arranged along the side wall of the by-pass stack part and a second portion arranged transversely across a section of the by-pass stack part; and a secondary isolation blank off plate configured to be arranged parallel and adjacent to said first portion of said primary blank off plate along the side wall of the by-pass stack part, and configured to reciprocate between said open and closed positions, wherein said primary blank off plate and said secondary isolation blank off plate are arranged to be distanced from each other along the side wall of the by-pass stack part to establish an air filled sealing gap there between.

\* \* \* \* \*